(No Model.) 2 Sheets—Sheet 1.
D. C. WOODWARD.
MACHINE FOR CUTTING GEARS.
No. 495,866. Patented Apr. 18, 1893.
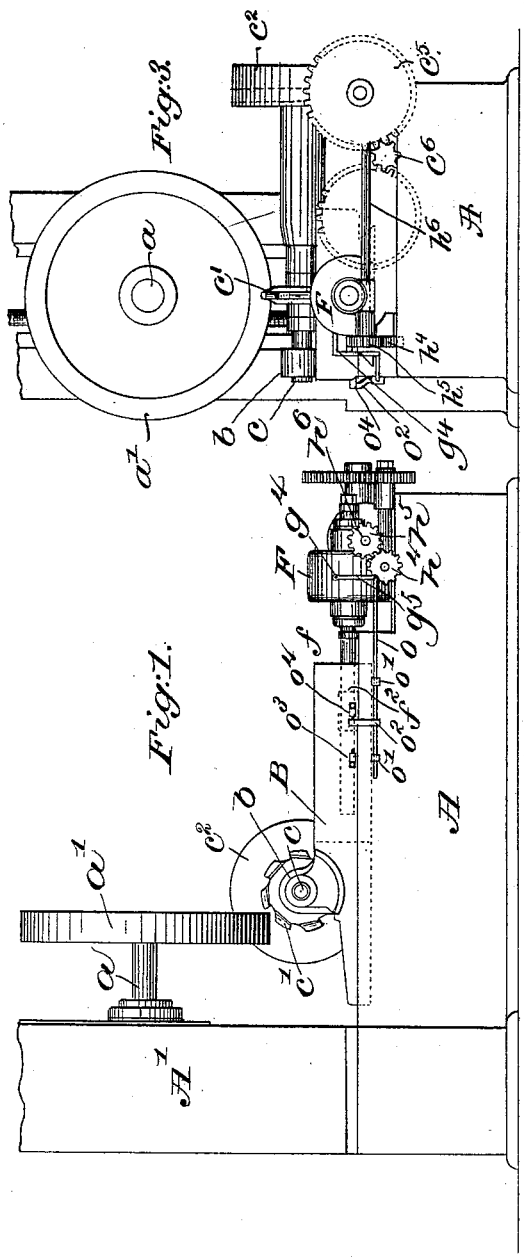
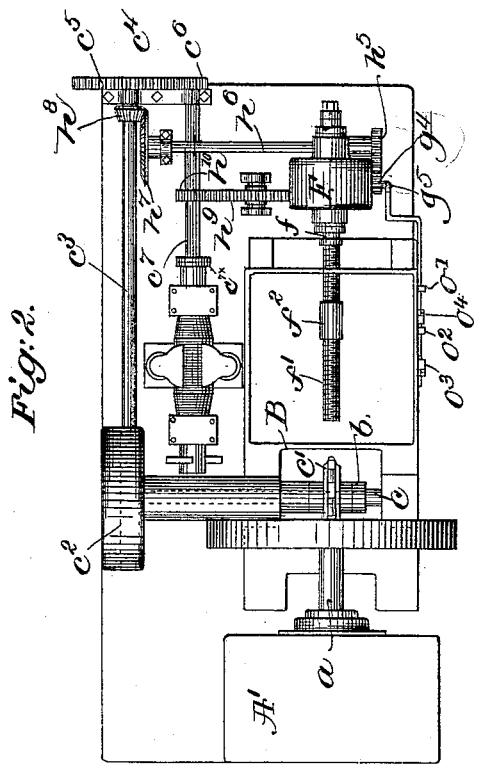
Witnesses.
Edward F. Allen
Louis N. Gowell
Inventor:
Daniel C. Woodward
by Crosby & Gregory
attys.

(No Model.) 2 Sheets—Sheet 2.
D. C. WOODWARD.
MACHINE FOR CUTTING GEARS.
No. 495,866. Patented Apr. 18, 1893.
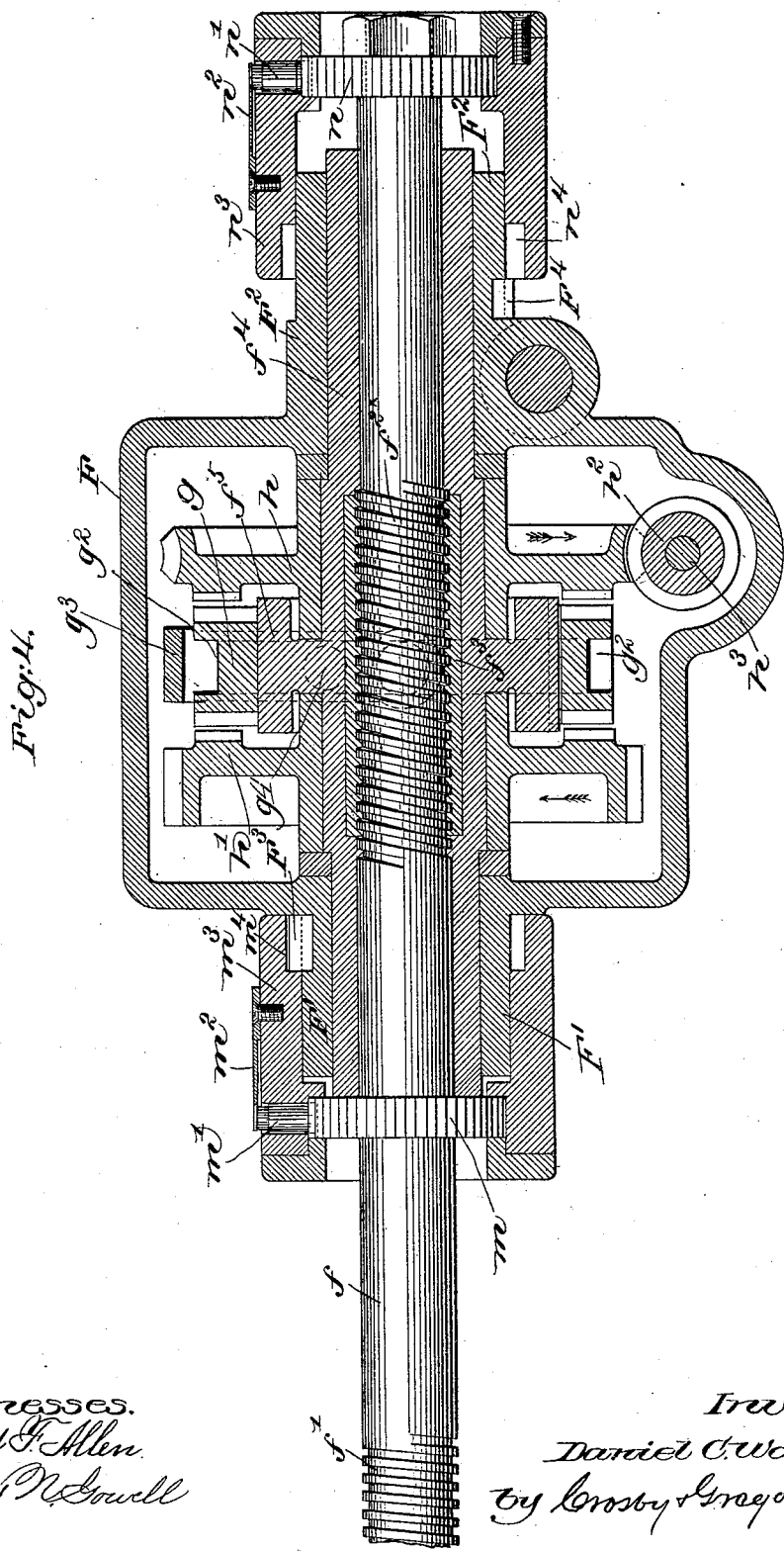
Witnesses.
Edward F. Allen
Louis N. Gowell
Inventor:
Daniel C. Woodward
by Crosby & Gregory
attys.

UNITED STATES PATENT OFFICE.

DANIEL C. WOODWARD, OF LYNN, MASSACHUSETTS.

MACHINE FOR CUTTING GEARS.

SPECIFICATION forming part of Letters Patent No. 495,866, dated April 18, 1893.

Application filed April 18, 1892. Serial No. 429,609. (No model.)

*To all whom it may concern:*

Be it known that I, DANIEL C. WOODWARD, of Lynn, county of Essex, State of Massachusetts, have invented an Improvement in Machines for Cutting Gears, of which the following description, in connection with the accompanying drawings, is a specification, like letters on the drawings representing like parts.

This invention has for its object to improve the construction of machines for cutting gear teeth, whereby the capacity of the machine may be increased. In machines of this class the gear blank is held stationary and the cutter moved or fed up to it, or else the cutter moves in fixed bearings and the gear blank is moved to it, and so far as I am aware, the feed of the one toward the other has heretofore always been a constant feed, that is, the one is moved toward the other at the same speed when the cutter is entering the blank and making only a partial cut, as when the cutter is making a full cut. When, however, the cutter is entering a blank and is not making a full cut, the feed may be quickened, and by increasing the speed for a short time while the cutter is entering the blank for each tooth on the wheel, the aggregate saving in time will be very considerable in the course of a day's work.

This invention, therefore, has for its object to provide a feed mechanism whereby the movable carriage of a gear cutting machine may be moved faster while the cutter is making only a partial cut or entering the blank, than when the cutter is making a full cut.

Figure 1, of the drawings represents in side elevation a gear cutting machine embodying this invention; Fig. 2, a top or plan view of the same; Fig. 3, an end elevation of Fig. 1; and Fig. 4, a sectional detail on an enlarged scale of one form of mechanism for giving a variable feed to the carriage.

Referring to the drawings, the bed A of suitable construction to sustain the working parts, is provided at one end with the head $A'$, which in the present embodiment of this invention carries the arbor $a$, which sustains the gear blank $a'$, suitable mechanism being provided, not however, herein shown, for rotating the gear blank at the proper time, the proper distance for the cutting of the teeth in its periphery, but which does not form a part of this invention.

The bed A has formed in it a suitable dovetailed guideway to receive and guide the sliding carriage B which in the machine shown constitutes a work-support, provided at its end nearest the head $A'$ with suitable bearings $b$ for the cutter shaft $c$ on which is fixed the milling cutter $c'$. The cutter shaft $c$ is rotated by means of a worm wheel $c^2$ shown by dotted lines Figs. 2, and 3, fast on one end of the shaft and in mesh with and driven by a worm, not shown, splined upon the shaft $c^3$ journaled in suitable bearings $c^4$ on the bed, said shaft at its rear end outside the bearings $c^4$ having fast upon it a spur wheel $c^5$ in mesh with and driven by a pinion $c^6$ on the main driving shaft $c^7$ also journaled in suitable bearings on the bed.

The carriage B is fed toward and from the gear blank by means of a feed shaft $f$ provided at its forward end, see Figs. 2 and 4, with a single thread $f'$ which enters a suitable nut $f^2$ on the carriage B, said feed shaft at or near its rear end being provided with a double thread $f^{2\times}$ which runs in a nut $f^3$ within a sleeve $f^4$ journaled in a suitable inclosing case F on the bed. The sleeve $f^4$, see Fig. 4, at its middle is provided with an annular cylindrical bearing surface $f^5$ on which is splined the clutch ring $g$, the said clutch ring being provided with an annular groove $g^2$ to receive roll or other studs on the ends of a fork or yoke $g^3$ shown in dotted lines Fig. 4, pivoted at $g^4$, in the inclosing case F, and provided outside the said case with an actuating arm $g^5$ to be referred to. The clutch ring $g$ is suitably formed at its opposite sides to engage respectively the forward feed wheel $h$ and the back feed wheel $h'$, both of which are journaled upon the sleeve $f^4$ referred to. The forward feed wheel $h$ is a worm wheel in mesh with and driven by a worm $h^2$ on the shaft $h^3$ provided outside the case F with a spur wheel $h^4$ in mesh with and driven by a spur wheel $h^5$ fast on a shaft $h^6$ extending crosswise of the machine and provided at its opposite end with a bevel wheel $h^7$ in mesh with and driven by a bevel pinion $h^8$ fast on and rotatable with the shaft $c^3$, see Fig. 2. The back feed wheel $h'$ is a spur wheel and is driven by a spur wheel $h^9$ in turn driven by a pinion $h^{10}$ on and rotatable with the main driving shaft $c^7$, see Fig. 2.

The feed shaft $f$ at opposite sides of the double worm $f^{2\times}$ and outside the inclosing case F has fixed to it two ratchet wheels $m, n$, the teeth of which face in opposite directions and are engaged respectively by pawls $m', n'$, acted upon by springs $m^2, n^2$, secured to the sleeves $m^3, n^3$, mounted to slide longitudinally on the extended bosses $F', F^2$ of the inclosing case F, the said bosses being provided respectively with splines or keys $F^3, F^4$, adapted to enter suitable recesses or grooves $m^4, n^4$, in the sliding sleeves.

The operation of the feeding mechanism is as follows, viz:—If the feed shaft $f$ be restrained from rotation and the nut $f^3$ carried by the sleeve $f^4$ rotated in fixed bearings about it, the shaft $f$ will be fed bodily forward out of the nut by its double thread $f^{2\times}$. But if the feed shaft $f$ be locked to the nut $f^3$ and sleeve $f^4$, it will be rotated therewith within the nut $f^2$ on the carriage B and cause the latter to be fed forward by the single thread $f'$, and as the double thread feeds as fast again as the single thread, it follows that by restraining the feed shaft from rotation and rotating the nut $f^3$ about it, a faster feed will be given the carriage B than by causing the feed shaft to be rotated in the nut carried by the carriage. Assuming the feed wheels $h$ and $h'$ to be rotating in opposite directions driven in the manner described, if the clutch ring $g$ be moved to the right Figs. 1 and 4, into engagement with the forward feed wheel $h$, rotating in the direction of the arrow Fig. 4, a similar rotative movement will be given the clutch ring and the bearing surface and sleeve $f^4$ to which it is splined. The feed shaft $f$, being restrained from rotation in the direction in which the sleeve $f^4$ is rotating, by the pawl $m'$ on the sliding sleeve $m^3$, the latter held by the spline $F^3$, rotation of the sleeve $f^4$ and the nut $f^3$ contained within it will act through the double thread $f^{2\times}$ to cause the stationary feed shaft $f$ to be fed bodily forward or to the left Fig. 4, pushing before it the carriage B carrying the rotating cutter $c'$, moving the latter up to the gear blank and to its work, the speed at which the cutter is fed to the gear blank being that due to the rotation of the nut $f^3$ about the double thread $f^{2\times}$. The sleeve $m^3$, restrained from rotation by the spline $F^3$, is moved forward with and by the feed shaft $f$, at the same time restraining the shaft from rotation until the sleeve leaves the spline $F^3$, when it is no longer restrained from rotation. The same movement of the feed shaft $f$ within the nut $f^3$ which moves the sliding sleeve $m^3$ forward out of engagement with the spline $F^3$, also moves the ratchet toothed wheel $n$ on the rear end of the shaft up to and in contact with the rear end of the sleeve $f^4$, so that further tendency of the thread $f^{2\times}$ to feed the shaft $f$ forward within the sleeve causes the ratchet wheel $n$ to be firmly pressed against the end of the rotating sleeve $f^4$ to cause the shaft $f$ to be thereby locked to and to rotate in unison with the sleeve $f^4$, said shaft thereafter by its rotation feeding the carriage forward by its single thread $f'$ rotating within the nut $f^2$ on the carriage. Thus the carriage B is given the faster feed of the double thread $f^{2\times}$ during the first part of its movement until the shaft $f$ has been moved bodily forward a sufficient distance to move the sleeve $m^3$ to clear the spline $F^3$ and bring the ratchet wheel $n$ into contact with the end of the sleeve $f^4$, after which the shaft and sleeve rotate in unison, causing the single thread $f'$ to give to the carriage a slower feed during the remainder of the movement of the carriage. As the ratchet wheel $n$ is moved up into contact with the end of the sleeve $f^4$, the sliding sleeve $n^3$ is also moved forward with it, the spline $F^4$ entering the groove $n^4$ in the sleeve to prevent rotation of the sleeve, the spring controlled pawl $n'$ on the sleeve, however, clicking over the teeth of the ratchet wheel $n$ as the same and the shaft $f$ are rotated during the farther forward movement of the shaft $f$. When the carriage has reached the end of its movement, the clutch ring $g$ will be moved from engagement with the forward feed wheel $h$ into engagement with the back feed wheel $h'$, rotating in the opposite direction as indicated by the arrow, said feed wheel giving to the clutch ring and to the sleeve $f^4$ a rotative movement also in the opposite direction, to cause the nut $f^3$ within the sleeve to be turned about the double thread of the feed shaft $f$ in the opposite direction from before, to feed the latter back or to the right Fig. 4, the spring-controlled pawl $n'$ on the sleeve $n^3$,—the latter being restrained from rotation by the spline $F^4$,—now acting to prevent rotation of the shaft, so that the latter may be fed bodily back by the rotation about it of the nut $f^3$. The feed shaft $f$ will continue to be fed bodily backward or to the right Fig. 4, by the rotating sleeve $f^4$ and nut $f^3$ until it has moved the sliding sleeve $n^3$ to the right a sufficient distance to clear the spline $F^4$, which will no longer prevent rotation of the shaft, and the ratchet wheel $m$ on the forward end of the sleeve $f^4$ at the same time, moves up into contact with the forward end of the said sleeve $f^4$ when the said shaft and sleeve will thereafter rotate in unison to cause the single thread $f'$ on the shaft to give the remainder of the return movement to the carriage B, the parts now being in their original positions in readiness for a similar forward feed for a new tooth. Thus the shaft $f$ is restrained from rotation for a short period at the beginning of the feed to cause its double thread to feed it and the carriage bodily forward at the higher speed until the sleeve $m^3$ leaves the spline $F^3$ and the ratchet wheel $n$ contacts with the sleeve $f^4$, when the shaft and sleeve will thereafter rotate in unison to cause the slower feed of the single thread $f'$ to move the carriage, the sleeve $n^3$ during this time moving up to the spline $F^4$ in readiness to prevent rotation of the shaft during the first part of the return movement in order to return the said shaft to its original normal position with relation to the nut $f^3$ and sleeve $f^4$ in readiness for a new forward feed for the next tooth. The clutch ring $g$ may be shifted or moved in any desired manner at the proper time to effect change in the direction of feed of the carriage B. The construction herein shown, however, consists of a rod $o$, jointed to the end of the shifting lever $g^5$ and mounted to slide in suitable bearings $o'$ on the bed A, the said rod between its bearings having a lug $o^2$ which is engaged by one or another of the adjustable spring-controlled or yielding pins $o^3$, $o^4$, on and during the movement of the carriage B. As the carriage moves forward, just before it reaches the end of its forward movement, the pin $o^4$ will strike the lug $o^2$ on the rod $o$ and move the latter to the left Fig. 1, to cause the yoke $g^3$ to move the clutch ring $g$ into engagement with the back feed wheel $h'$. Just before the carriage reaches the end of its backward movement, the spring pin $o^3$ on the carriage will strike the lug $o^2$ on the rod, move the latter to the right, and cause the clutch ring to be moved out of engagement with the back feed wheel and into engagement with the forward feed wheel. The machine thus automatically increases the feed during a portion of the movement of the carriage, while the cutter is not making its full cut.

While I have herein shown a moving carriage as carrying the cutter, the gear blank being held stationary, the gear blank may be carried by the moving carriage and be moved up to a fixed cutter, one being the full equivalent of the other.

In lieu of the double thread $f^{2\times}$, herein shown as giving to the carriage its faster feed, I may employ its equivalent, viz:—a single or even a triple or other thread of greater pitch than the thread $f'$.

In my efforts to improve the operations of this class of machines and to control the same more perfectly, I have discovered that both these results may be attained by driving the main shaft $c^7$ direct from the armature of an electric motor carried on the bed of the machine, and the drawing Fig. 2, represents a motor M mounted upon the bed of the machine and having its armature shaft attached directly to the driving shaft by means of a suitable coupling $c^{7\times}$. By this means, no driving belt is necessary, and by reversing or controlling the current of the motor the machine may be much more readily and positively controlled by the operator than where it is necessary to control the same by the shifting of belts, clutches, or the like.

This invention is not limited to the particular construction of the various parts herein shown, nor the particular machine herein shown, as the invention relating to the feed mechanism is applicable to any design or style of the machine.

I claim—

1. A work support, a cutter, and a reciprocating carriage to move one toward the other and thereby feed the cutter into the work, combined with a variable speed feed mechanism for the carriage to automatically feed the same faster while the cutter is making only a partial cut than when the cutter is making a full cut, substantially as and for the purpose specified.

2. A work support, a rotating cutter, and a reciprocating carriage to move the one toward the other and thereby feed the cutter into the work, combined with a feed mechanism for the carriage including two threads of different pitch and operating automatically through first one and then the other of said threads, to thereby vary the speed at which the carriage is moved, substantially as and for the purpose specified.

3. A machine for cutting gears, containing the following instrumentalities, viz:—a movable carriage, a feed shaft therefor threaded in said carriage, rotation of the shaft causing its thread to move the carriage, a double thread upon the shaft, a rotating nut therefor, and means to restrain the said shaft from rotation during a portion of the movement of the carriage to give to the same the feed due to the relative rotation of the double thread and its nut and to thereafter cause the said shaft and nut to rotate in unison to give to the carriage the feed due to the rotation of its single thread in the carriage, substantially as described.

4. In a machine for cutting gears the combination of the following instrumentalities, viz:—a movable carriage, a feed shaft threaded in said carriage with a single thread and provided with a double thread within a rotating nut, ratchet wheels on the said shaft having teeth facing in opposite directions, co-operating pawls therefor, and mechanism acting through said pawls to restrain said shaft from rotation for a time during the movements of the carriage to give to the latter the feed due to the double thread and to thereafter permit rotation of the shaft and nut in unison to give to the carriage the feed due to the single thread, substantially as described.

5. In a machine for cutting gears, the combination of the following instrumentalities, viz:—a movable carriage, a feed shaft threaded therein with a single thread, a double thread on said shaft, a nut in which said double thread turns, a rotating sleeve carrying the nut in which said double thread rotates, fixed bearings for the said sleeve, and means to rotate the sleeve in opposite directions, ratchet wheels at opposite sides of the said double thread having teeth facing in opposite directions, co-operating spring controlled pawls for the said ratchet wheels, sliding sleeves carrying the pawls, and means to restrain the said sleeves from rotation during a portion of the movement of the shaft in either direction, to operate, substantially as described.

6. In a machine for cutting gears, the combination of the following instrumentalities, viz:—a movable carriage, a feed shaft threaded therein with a single thread, a double thread on said shaft, a nut in which said double thread turns, a rotating sleeve carrying the nut in which said double thread rotates, fixed bearings for the said sleeve, and means automatically controlled by the movement of the carriage to rotate the sleeve in opposite directions, ratchet wheels at opposite sides of the said double threads having teeth facing in opposite directions, co-operating spring controlled pawls for the said ratchet wheels, sliding sleeves carrying the pawls, and means to restrain the said sleeves from rotation during a portion of the movement of the shaft in either direction, to operate, substantially as described.

In testimony whereof I have signed my name to this specification in the presence of two subscribing witnesses.

DANIEL C. WOODWARD.

Witnesses:
FREDERICK L. EMERY,
M. J. SHERIDAN.